H. F. CHAPPELL.
METHOD OF RECOVERING POTASSIUM SULFATE AND ALUMINA FROM ALUNITE.
APPLICATION FILED JULY 23, 1913.
1,268,433. Patented June 4, 1918.
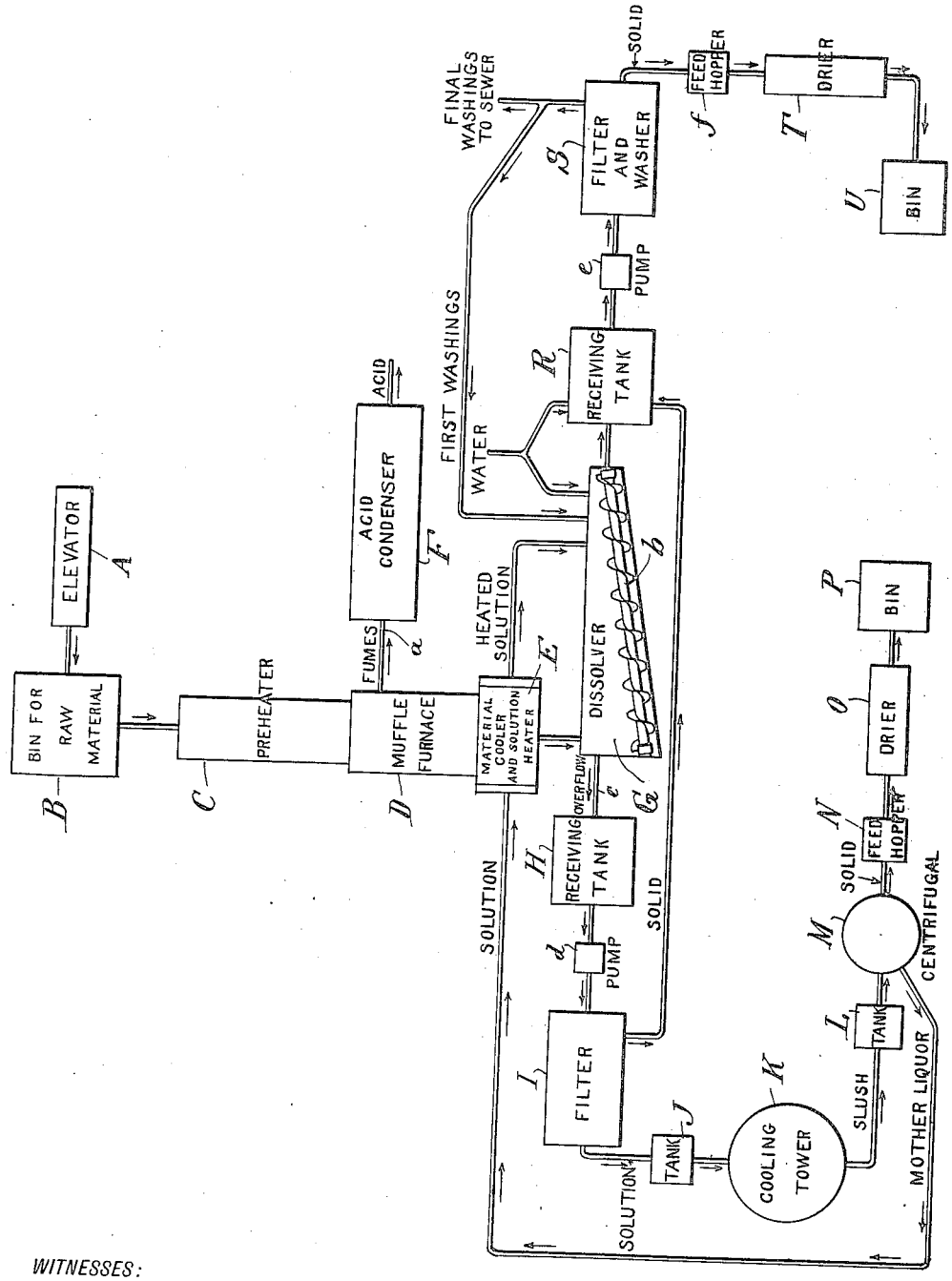

UNITED STATES PATENT OFFICE.

HOWARD F. CHAPPELL, OF NEW YORK, N. Y., ASSIGNOR TO MINERAL PRODUCTS CORPORATION, OF NEW YORK, N. Y., A CORPORATION OF MAINE.

METHOD OF RECOVERING POTASSIUM SULFATE AND ALUMINA FROM ALUNITE.

1,268,433.  Specification of Letters Patent.  Patented June 4, 1918.

Application filed July 23, 1913. Serial No. 780,665.

*To all whom it may concern:*

Be it known that I, HOWARD F. CHAPPELL, a citizen of the United States, residing in the borough of Manhattan, city, county, and State of New York, have invented certain new and useful Improvements in Methods of Recovering Potassium Sulfate and Alumina from Alunite; and I do hereby declare the following to be a full, clear, and exact description of the invention, such as will enable others skilled in the art to which it appertains to make and use the same.

In an application for Letters Patent of the United States, filed by me under date of May 8, 1913, Serial No. 766,269, I have described and shown certain improvements in the roasting or calcining of alunite, wherein the roasted product, hot from the heat of calcining, is discharged into a dissolver, that is to say, into a receptacle wherein the potash salts contained in the roasted alunite are brought into solution. In this roasting operation the aluminum sulfate is broken up, yielding alumina while the potassium sulfate remains as such.

The present invention relates to the treatment of the solution for the recovery of the potash salts therefrom and also to the utilization of the heat of the roasted alunite, as will be hereinafter more fully described, for facilitating the operation and increasing its general economy.

In the preferred practice of the invention, the roasted alunite is conducted hot from the heat of roasting or calcining into the dissolver, wherein the potash salts go into solution. From the dissolver, the potash salt solution passes through a filter, and is then cooled in a cooling tower. The cooling of the liquor lessens its capacity for maintaining the potash salt in solution, and, as a consequence thereof, a large proportion of the potash salt is deposited out of the solution. The mother liquor, that is to say, the liquor from which the potash salts have been deposited and which still contains in solution a minor proportion thereof is then freed from the deposited salts in any suitable way, as, for instance, by filtering or centrifugalizing, and is then ready to be returned to the dissolver.

In order to bring up to the desired maximum the dissolving power of this mother liquor, its temperature is raised, and, as hereinbefore indicated, this is conveniently and economically effected by the heat of the roasted alunite. Thus, the mother liquor on its return to the dissolver may be heated by passing it through a heating jacket enveloping the lower or discharge portion of the calcining retort or muffle, and also with the additional advantage that the heat thus imparted to the solution is likewise abstracted from the walls of the jacketed part of the retort, thereby correspondingly increasing their durability. The heat thus imparted to the mother liquor and which is to be utilized in increasing its capacity for dissolving the potash salts of a new batch of the calcined alunite admitted into the dissolver is further increased by the heat imparted to it by the direct entry of the new batch of hot roasted alunite into the dissolver; so that by reason of the rise of temperature thus provided, the liquor in the dissolver is in condition to bring into solution the potash salts of the new batch.

It will be apparent, therefore, that the fundamental or characteristic mode of operation of the process consists in utilizing the heat of the roasted alunite to bring the liquor in the dissolver to so high a temperature that it will have the maximum dissolving capacity for potash salts, and to recover the major portion of the potash salts thus dissolved by cooling the solution thereby decreasing its capacity for maintaining the potash salts in solution, and again restoring the liquor to a capacity for taking up in solution the potash salts of a new charge or batch of roasted alunite by once more raising its temperature, utilizing for that purpose the heat of the calcining mass.

It is further to be noted that the hot solution of potash salts, on its way through the cooling tower undergoes considerable evaporation and this evaporation likewise contributes toward the depositing out of the potash salts from the mother liquor. In the cooling tower, the solution is preferably sprayed downwardly through an upwardly rising current of atmospheric air, which may be admitted at ordinary atmospheric temperatures and which, moving in a current through the finely divided solution has not only a cooling function but also the evaporating effect referred to.

It will be understood that after the potash salts have been lixiviated out of the roasted alunite, the residue, that is to say, the alumina, is removed in any suitable manner from the dissolver and is washed to recover any of the potash salt solution contained in it, and that these washings may be conveniently returned to the dissolver, serving to replenish the water lost in the stated evaporation.

In the accompanying drawing is indicated, diagrammatically, a general arrangement of apparatus suitable for the practice of the invention.

Referring to the drawing, A indicates an elevator for raising the raw or uncalcined alunite into the feeding bin B, from which it is discharged into the preheater C of the muffle furnace D whose jacketed discharge end is indicated at E. From the muffle furnace, the fumes pass at $a$ into an acid condenser F. G represents the dissolver and $b$ the feeding device for removing the alumina therefrom. All of these parts are fully described and illustrated in my application Ser. No. 766,269 hereinbefore referred to.

From the dissolver G an overflow $c$ conveys the hot solution of potash salts into the receiving tank H from which it is pumped by the pump $d$ into the filter I. From the filter the hot solution passes through the tank J from which it is sprayed down through the cooling tower K against an upwardly rising current of atmospheric air. The slush from the cooling tower is received in the tank L and is then conveyed into the centrifugal machine M, wherein the potash salts deposited out of the solution are freed from the mother liquor and are received in a feed-hopper N which supplies them to a drier O and eventually to a storing bin P.

The filtered, cooled and partially evaporated mother liquor is returned, as indicated in the drawing, to the dissolver after first passing through the jacket of the discharge portion E of the muffle furnace, and, as hereinbefore explained, is heated thereby before again entering the dissolver. The alunite, hot from the heat of calcining is dropped into the aqueous solvent in the dissolver, and adds heat directly thereto.

The alumina from the dissolver is removed, after lixiviation into a receiving tank R and is pumped therefrom by a pump $e$ into a filter and washer S. The first washings from this filter are returned to the dissolver and the final washings to a sewer, as indicated. The solids, (i. e., the washed alumina) pass from the filter S into a feed-hopper $f$, thence to a drier T and finally to a receiving bin U.

In connection with the foregoing description, of apparatus appropriate to the practice of the invention, it will be understood that I do not limit myself to any specific form or modification thereof.

The availability of the invention for successful commercial practice is based largely upon the circumstance that the solubility of the potash salt (potassium sulfate) in water at 100° C. is more than twice as great as its solubility in water at 20° C., so that the recovery of the potash is dependent upon this difference in solubility assisted by the evaporation effected in the cooling tower.

A dissolver of the Hendrix type may be used for the purposes of that element of the construction and in starting the operation the dissolver contains water. During the subsequent stages of the operation it is filled, as hereinbefore indicated, with the mother liquor returned from the cooling tower and which is, in fact, a solution of potassium sulfate. To this solution which represents a saturated solution at ordinary temperatures, small amounts of wash water from other stages of the process are added in the dissolver as has been described. In my operation hereinbefore referred to, I prefer to construct the dissolver with an inclined bottom and with a revolving screw which serves to remove the alumina and discharges into the receiving tank. Sufficient water is added to the alumina in the receiving tank to make it fluid so that it can be pumped into the filter, which may be a filter of the Sweetland type. 60% of the weight of water is ordinarily sufficient for the purpose. In the filter, the alumina is washed until practically free from potash salts, whereupon the first filtrate and the washings containing potassium sulfate are returned to the dissolver, as described, along with the mother liquor which has come from the centrifugal mass. The final washings of the filter containing an insignificant amount of salts are run to waste in the sewer or otherwise.

What I claim is:

1. The process of producing potassium sulfate and alumina from alunite, which comprises introducing hot, calcined alunite into an aqueous solvent, thereby raising the temperature of the solvent and increasing its capacity to dissolve potassium sulfate, removing the hot solution of potassium sulfate from the undissolved alumina, cooling the said hot solution, and recovering the potassium sulfate which separates out when the solution is cooled; substantially as described.

2. The process of producing potassium sulfate and alumina from alunite, which comprises passing the calcined alunite, while still hot from the heat of calcining, into an aqueous solvent, lixiviating out the potash salts thereby, filtering the solution, conducting the filtered solution through a cooling tower, thereby precipitating potash salts therefrom, removing the mother liquor from the separated salts and returning the filtered condensed mother liquor to the dissolver to lixiviate a further portion of calcined alunite; substantially as described.

In testimony whereof I affix my signature, in presence of two witnesses.

HOWARD F. CHAPPELL.

Witnesses:
M. A. BILL,
M. L. BOWEN.